US008375220B2

(12) United States Patent
Prakash et al.

(10) Patent No.: US 8,375,220 B2
(45) Date of Patent: Feb. 12, 2013

(54) METHODS AND SYSTEMS FOR SECURE REMOTE WAKE, BOOT, AND LOGIN TO A COMPUTER FROM A MOBILE DEVICE

(75) Inventors: Gyan Prakash, Beaverton, OR (US); Farid Adrangi, Lake Oswego, OR (US); Saurabh Dadu, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 12/753,591

(22) Filed: Apr. 2, 2010

(65) Prior Publication Data

US 2011/0246757 A1    Oct. 6, 2011

(51) Int. Cl.
*H04L 29/06* (2006.01)
(52) U.S. Cl. ............................................ 713/187; 726/1
(58) Field of Classification Search ............ 713/2; 726/7
See application file for complete search history.

(56) References Cited

U.S. PATENT DOCUMENTS

| | | | |
|---|---|---|---|
| 7,039,708 B1 | 5/2006 | Knobl et al. | |
| 7,188,110 B1* | 3/2007 | Ludtke et al. | 382/115 |
| 2003/0084342 A1 | 5/2003 | Girard | |
| 2005/0085245 A1 | 4/2005 | Danneels | |
| 2008/0211670 A1 | 9/2008 | Gordon | |
| 2009/0064316 A1* | 3/2009 | Liao et al. | 726/18 |
| 2009/0083534 A1* | 3/2009 | Challener et al. | 713/2 |

FOREIGN PATENT DOCUMENTS

| | | |
|---|---|---|
| EP | 1909511 A1 | 4/2008 |
| JP | 200-4258835 A | 9/2004 |
| JP | 2007-058420 A | 3/2007 |
| JP | 2009-509210 A | 3/2009 |
| WO | 2001/080525 A1 | 10/2001 |
| WO | 2005/024743 A1 | 3/2005 |

OTHER PUBLICATIONS

Extended Search Report received for European Patent Application No. 11250411.3, mailed on Aug. 18, 2011, 8 pages.
Japanese Office Action Received for the Japanese Patent application No. 2011-081748 mailed on Nov. 27, 2012, 5 Pages of Office Action including 3 pages of English translation.
Korean Office Action Received for the Korean Patent application No. 10-2011-0030370 mailed on Sep. 26, 2012, 5 Pages of Office Action including 2 pages of English translation.
European Office Action Received for the European Patent application No. 11250411.3 mailed on Nov. 2, 2011, 6 pages of Office Action.

* cited by examiner

*Primary Examiner* — Gilberto Barron, Jr.
*Assistant Examiner* — Devin Almeida
(74) *Attorney, Agent, or Firm* — Garrett IP, LLC

(57) ABSTRACT

Methods and systems to allow an authorized user to remotely awaken, boot, and login to a computer in a secure manner. The user and computer may communicate using a short message service. (SMS). The user may communicate with the computer using a mobile device, such as a smart phone. The user may initially provide a wake-up message to the computer, which may then respond by asking for one or more boot passwords. In an embodiment, these boot passwords may be basic input/output system (BIOS) passwords that are required for the loading and operations of the computer's BIOS. The user may then provide these one or more passwords to the computer. The computer may further request an operating system (OS) login password. The user may then provide this password to the computer. In an embodiment, all passwords may be provided to the computer in encrypted form. Moreover, authentication measures may be used to provide assurance that the user is legitimate.

24 Claims, 11 Drawing Sheets

METHODS AND SYSTEMS FOR SECURE REMOTE WAKE, BOOT, AND LOGIN TO A COMPUTER FROM A MOBILE DEVICE

BACKGROUND

There are times when a person requires access to a computer remotely. A user may need to boot and/or login to the computer, to access data or applications. Alternatively, maintenance may need to be performed on the computer, but immediate physical access to the machine may not be possible. Under normal circumstances, a user may need to provide one or more boot passwords in order to allow the computer to boot securely, and may need to provide a login password in order to access the operating system (OS).

It may become problematic if the user needs to engage in such interactions remotely. Passwords would have to be transmitted to the computer; but to provide passwords over an open, public network (e.g., the Internet) is risky. The passwords may be readily compromised. If an unauthorized party obtains the passwords, he or she can then pose as an authorized user and access the machine.

BRIEF DESCRIPTION OF THE DRAWINGS/FIGURES

Figure 1:
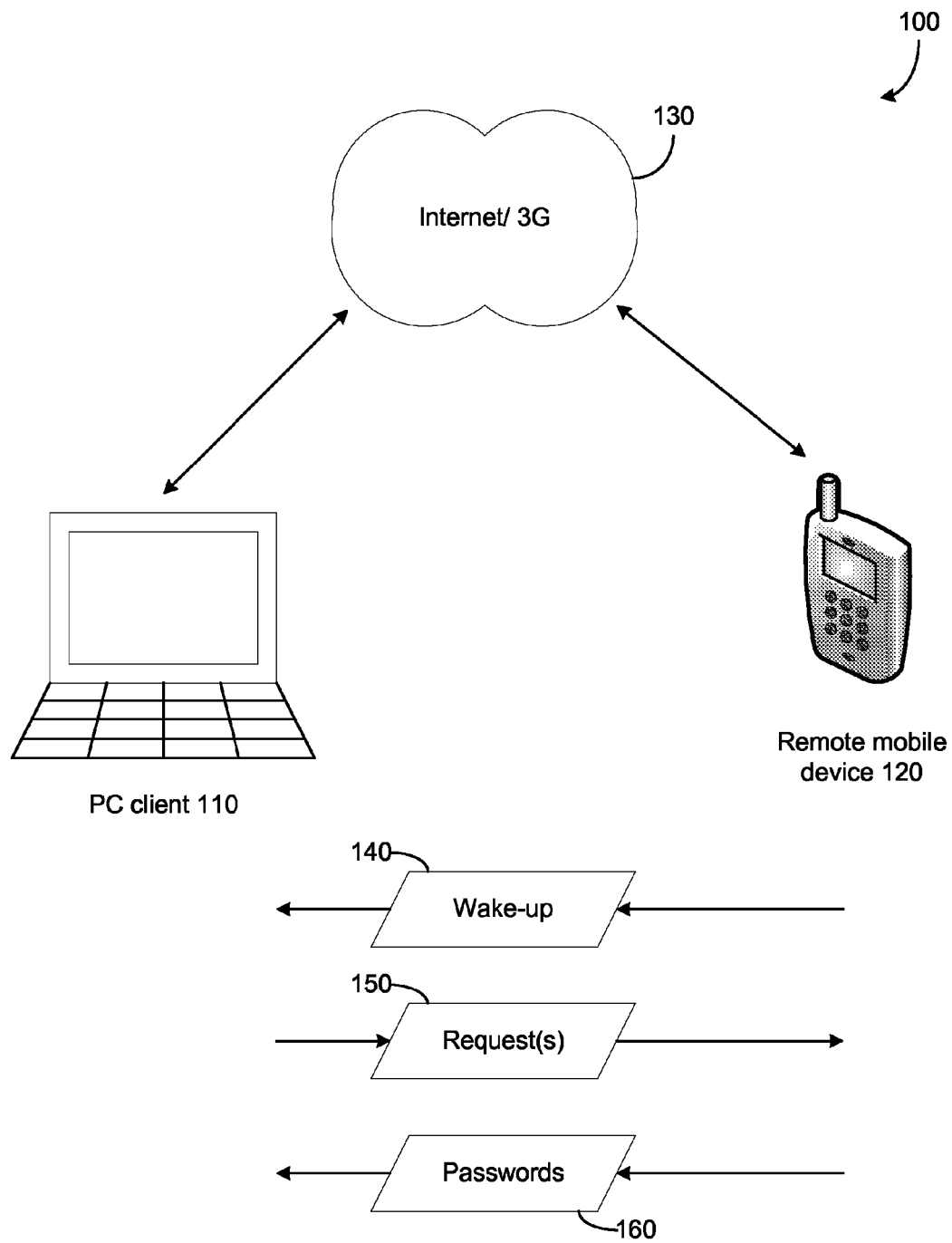
FIG. 1 illustrates the overall processing of the system described herein, according to an embodiment.

In the drawings, the leftmost digit(s) of a reference number identifies the drawing in which the reference number first appears.

DETAILED DESCRIPTION

A preferred embodiment is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems to allow an authorized user to remotely awaken, boot, and login to a computer in a secure manner. To do so, the user may communicate with the computer using a mobile device, such as a smart phone. The user and computer may communicate using a short message service (SMS). The user may initially provide a wake-up message to the computer, which may then respond by asking for one or more basic input/output system (BIOS) passwords. In an embodiment, these may be required for the operation of the computer's BIOS and for the eventual booting of the operating system. The user may then provide these one or more passwords to the computer. The computer may further request an operating system (OS) login password. The user may then provide this login password to the computer. In an embodiment, passwords may be provided to the computer in encrypted form. Moreover, authentication measures may be used to provide assurance that the user is legitimate.

Operation of the system described herein is illustrated generally in FIG. 1, according to an embodiment. Here, a user may seek to access a computer remotely. In this particular example, the user may attempt to access a client 110 that is running on a personal computer (PC). The PC may use a version of the Windows OS, available from Microsoft Corporation of Redmond, Wash. The user may communicate with the PC client 110 using a mobile device 120. Mobile device 120 may be a smart phone. Alternatively, mobile device 120 may be a more fully featured computing platform, such as a laptop computer. In yet another embodiment, a user may use both a smart phone and a local computer, where the smart phone is tethered to the local computer. The mobile device 120 may communicate with PC client 110 over a network 130. The network 130 may be, for example, the Internet or a data network such as a 3G network, or some combination thereof. Network 130 may alternatively be a local area or wide area network. In an embodiment, the PC client 110 and the mobile device 120 may communicate using messages via a short message service (SMS).

Mobile device 120 may begin by sending a wake-up message 140 to the PC client 110. In an embodiment, the wake-up message 140 may be encrypted and/or authenticated. If the wake-up message 140 is successfully decrypted and authenticated, then the PC client 110 and the mobile device 120 may then engage in a secure dialogue in which PC client 110 requests passwords from mobile device 120, and then receives these passwords. This dialogue is shown as requests 150 and passwords 160. Transmission of requests 150 and passwords 160 may be interleaved, such that a request may be followed by a password, followed by another request and another password. The PC client 110 may issue one or more requests to the mobile device 120, seeking one or more passwords.

The passwords may include BIOS passwords. As will be described in greater detail below, the required passwords may include a BIOS boot password, a pre-boot BIOS password, a disk unlock/decrypt password, and/or an antitheft recovery password. As in the case of the wake-up message 140, the BIOS passwords may be encrypted and authenticated. If the BIOS passwords are successfully decrypted and authenticated, the BIOS may be started up, and the client 110 may request a login password from the mobile device 120. The mobile device 120 may then respond by providing a login password that, again, may be encrypted and/or authenticated. If the login password is successfully decrypted and/or authenticated, then the remote user may be given access to the OS and login may proceed.

Figure 2:
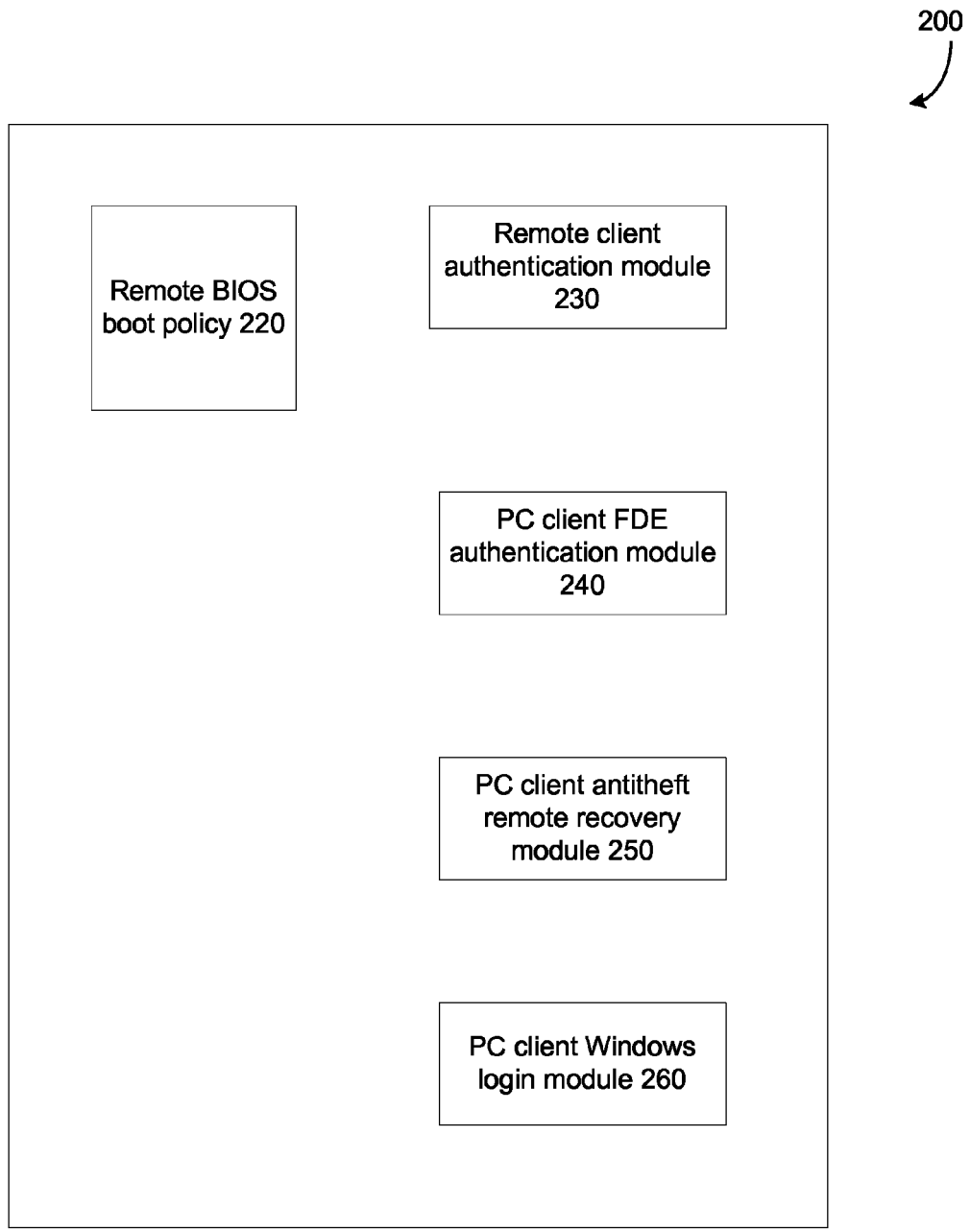
FIG. 2 is a block diagram illustrating logic in a management tension client secure boot and authentication module, according to an embodiment.

In an embodiment, the computer being accessed remotely may be a personal computer, as noted above. Such a computer may include firmware that executes on an out-of-band processor, where the firmware provides administrative functionality for the PC. One example of such a subsystem is the Management Engine (ME) available from Intel Corporation of Santa Clara, Calif. The logic of the system described herein may be implemented in a ME Client Secure Boot and Authentication Module 210, as illustrated in FIG. 2. Module 210 may be implemented as firmware in the ME. Module 210 may include a remote BIOS boot policy 220. Policy 220 represents information that may define the privileges that are to be accorded particular parties seeking to access the PC. In particular, remote BIOS boot policy 220 may specify how to handle different sources of an access attempt. Such sources may be different remote users, organizations, or machines attempting to access the PC. Remote boot policy 220 may provide that different specific users be treated differently, or that different machines or organizations be treated differently. Different remote users may, for example, be subject to different security protocols. Such protocols may provide for different methods of authentication and encryption, for example. Upon receipt of a wake-up message, the remote BIOS boot policy 220 may be consulted in order to determine the protocols that will be applied, depending on the source of the wake-up message.

Module 210 may also include a remote client authentication module 230. This module may be responsible for authenticating a remote user or client. In an embodiment, any trust relationship between the remote mobile device and the ME firmware may be established during service enrollment. In an embodiment, trust may be re-verified for some or all communications sent from the remote mobile device to the computer.

Module 210 may also include a PC client full disk encryption (FDE) authentication module 240. Module 240 may be responsible for receiving a disk unlock/decrypt password from the remote mobile device. The FDE authentication module 240 may provide authentication services in such a transaction. The FDE authentication module 240 may provide this password to an ME firmware if authentication succeeds. The ME firmware may then provide the password to a pre-boot authentication secure remote login module (not shown), which may then allow the boot process to proceed.

Module 210 may also include a PC client antitheft remote recovery module 250. This module may be responsible for receiving a user's antitheft recovery password from the remote mobile device, and providing authentication services for the recovery password. If the authentication is passed, the boot process may be allowed to continue.

Module 210 may also include a PC client Windows login module 260. Module 260 may be responsible for authenticating an attempt to remotely login to the OS. Login module 260 may provide the OS login password to the OS securely via the ME. The ME firmware may provide the login password to the pre-boot authentication secure remote login module.

Figure 3:
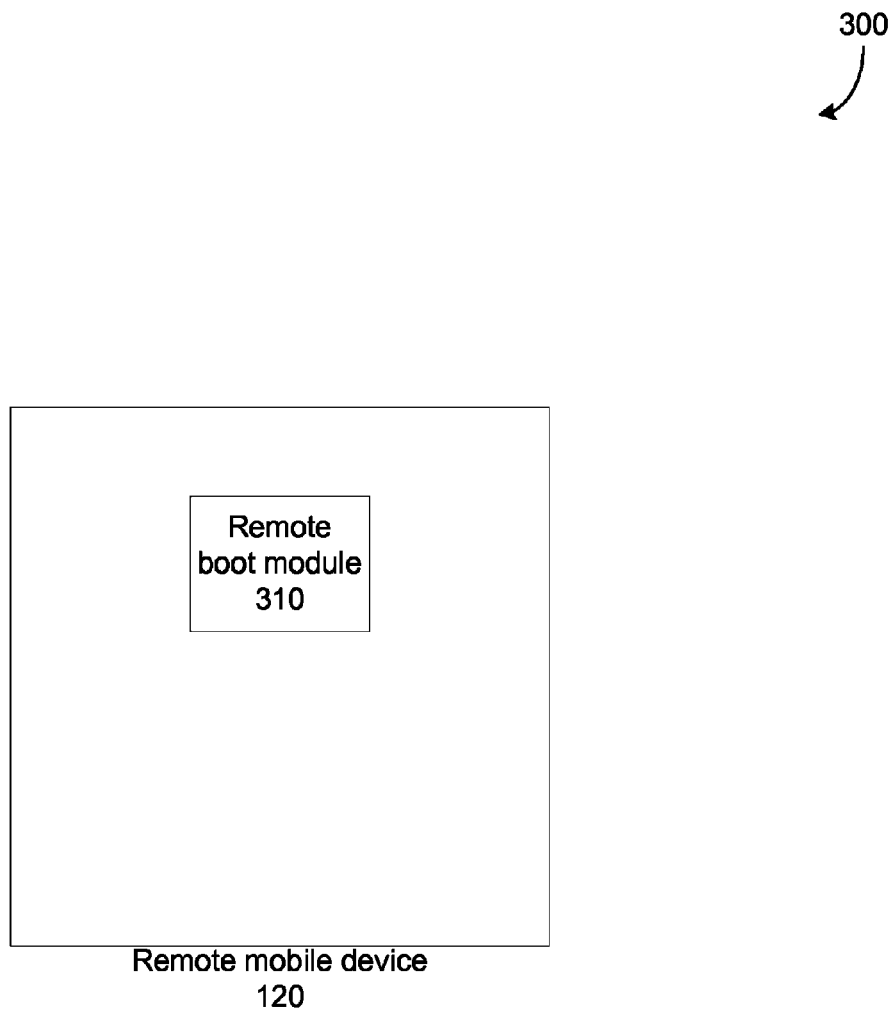
FIG. 3 is a block diagram illustrating a remote boot module in a remote mobile device, according to an embodiment.

At the remote mobile device 120, logic for the system described herein may be implemented as a remote boot module 310 as seen in FIG. 3, according to an embodiment. As discussed above, the remote mobile device 120 interacts with a PC client in a secure, trusted relationship. In particular, in an embodiment the remote mobile device 120 may be viewed as a remote mobile client. The remote boot module 310 may be responsible for sending secure messages to the PC client. These messages may include, for example, one or more BIOS passwords and an operating system login password. These messages may be encrypted, and may be authenticated. In an embodiment, these messages are transmitted over a short message service (SMS) or other suitable communications service.

Figure 4:
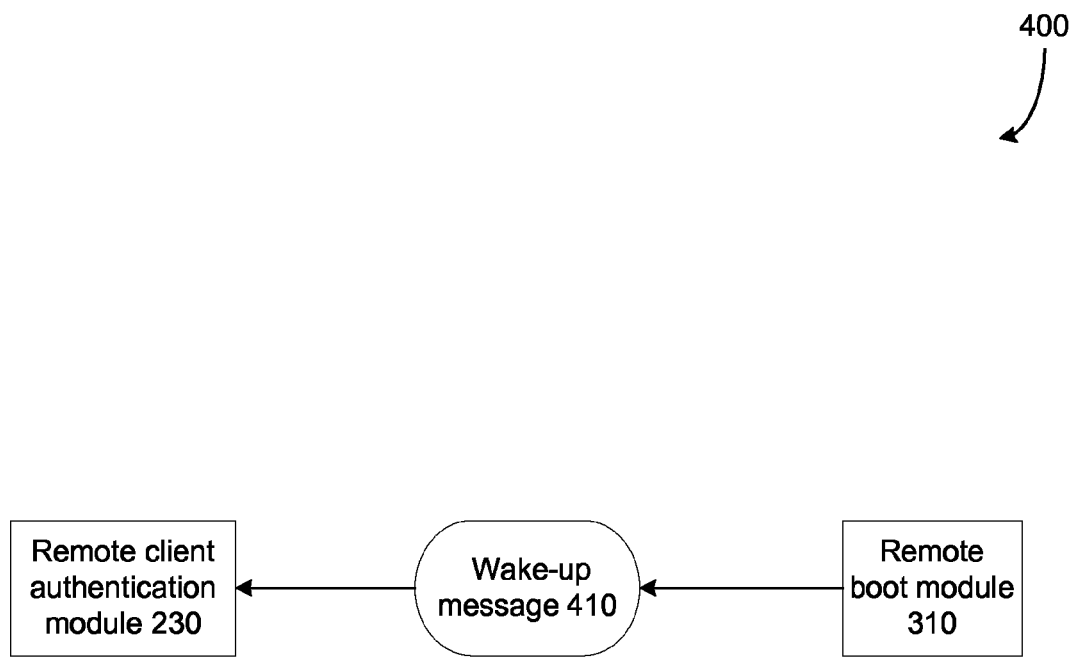
FIG. 4 illustrates the transmission of a wake-up message from a remote mobile device to a computer, according to an embodiment.

These messages may also include the initial wake-up message which, if successfully authenticated, may lead to an active platform state at the PC. Processing may begin by the transmission of the wake-up message from the remote mobile device to the computer sought to be accessed. This is illustrated in FIG. 4, according to an embodiment. A wake-up message 410 may be sent from the remote boot module 310 located at the remote mobile device. The wake-up message 410 may be received by the remote client authentication module 230. As discussed above, the remote client authentication module 230 may be embodied in management engine firmware. The wake-up message 410 may be transmitted over SMS or other suitable communications service. In the case of SMS, wake-up message 410 may be received by a modem, such as a 3G modem at the PC client. In addition, wake-up message 410 may be encrypted and/or authenticated for security reasons. In the illustrated embodiment, authentication may be the responsibility of remote client authentication module 230. If the authentication is successful, the computer may initiate the wake-up process.

Figure 5:
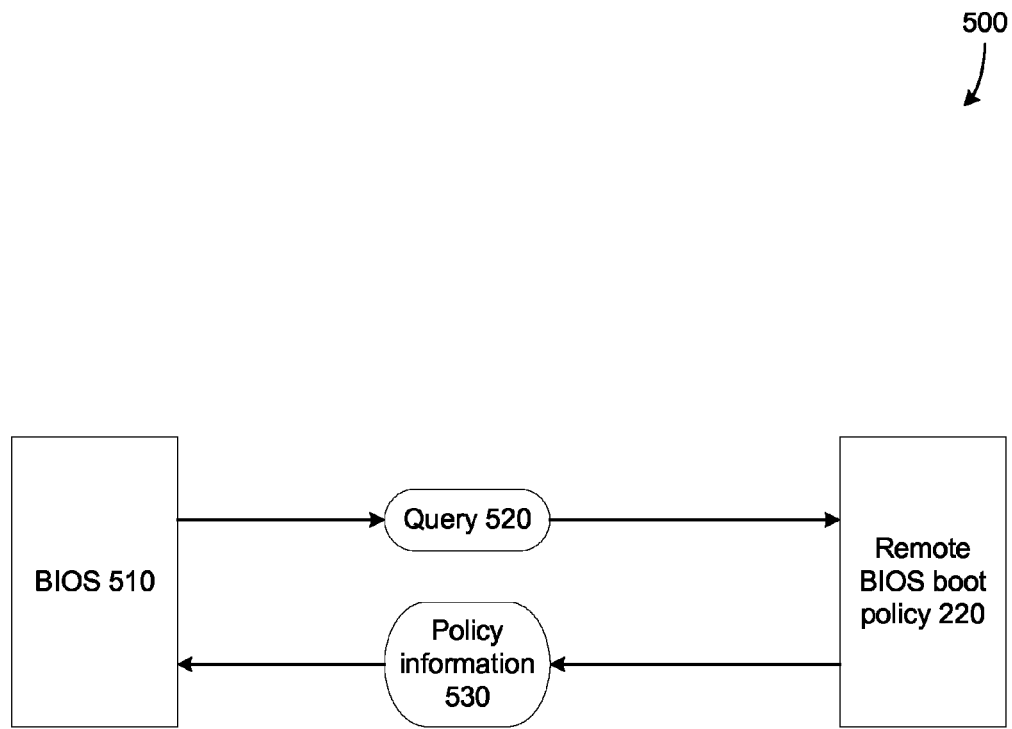
FIG. 5 illustrates the retrieval of remote BIOS boot policy information, according to an embodiment.

In addition, a security policy may be consulted at the PC, in order to determine how this access attempt is to be handled. This consultation process is illustrated in FIG. 5. At the PC, the BIOS 510 issues a query 520 to the remote BIOS boot policy 220. In an embodiment, query 520 may be specific, inasmuch as it may specify the source of the wake-up message. The result of query 520 may be policy information 530, which is then made available to BIOS 510. Policy information 530 may include an indication as to how the source is to be handled, for example, what security protocols are to be applied, the type of authentication or decryption processing to use, etc. In an embodiment, remote BIOS boot policy 220 may be implemented as a database, lookup table, or similar data structure.

Figure 6:
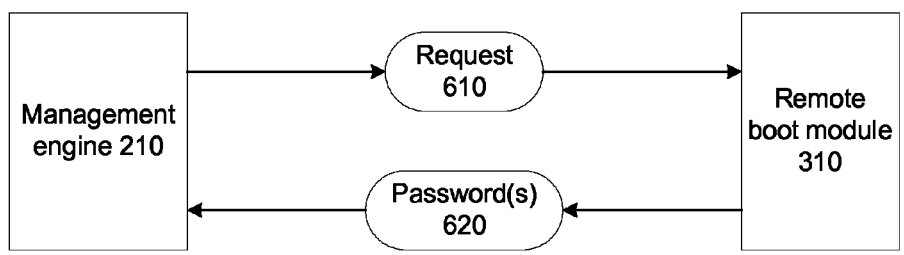
FIG. 6 illustrates the request, by a management engine, of BIOS passwords from a remote mobile device, according to an embodiment.

The boot process at the PC may require one or more BIOS passwords in order to proceed. In an embodiment, these passwords would be supplied from the remote mobile device. This transaction is illustrated generally in FIG. 6, according to an embodiment. The management engine 210 at the PC issues one or more requests 610 to the remote boot module 310 at the remote mobile device. The requests 610 may seek one or more BIOS passwords. These may include, for example and without limitation, a BIOS boot password, a pre-boot BIOS password, a disk unlock/decrypt password, or an antitheft recovery password. In an embodiment, requests 610 may be transmitted over SMS.

The remote boot module 310 may respond by providing requested password(s) 620. These may be sent to management engine 210, in an embodiment. This transmission as well may use SMS or another suitable communications system. Furthermore, passwords 620 may be encrypted and/or authenticated for security reasons.

Figure 7:
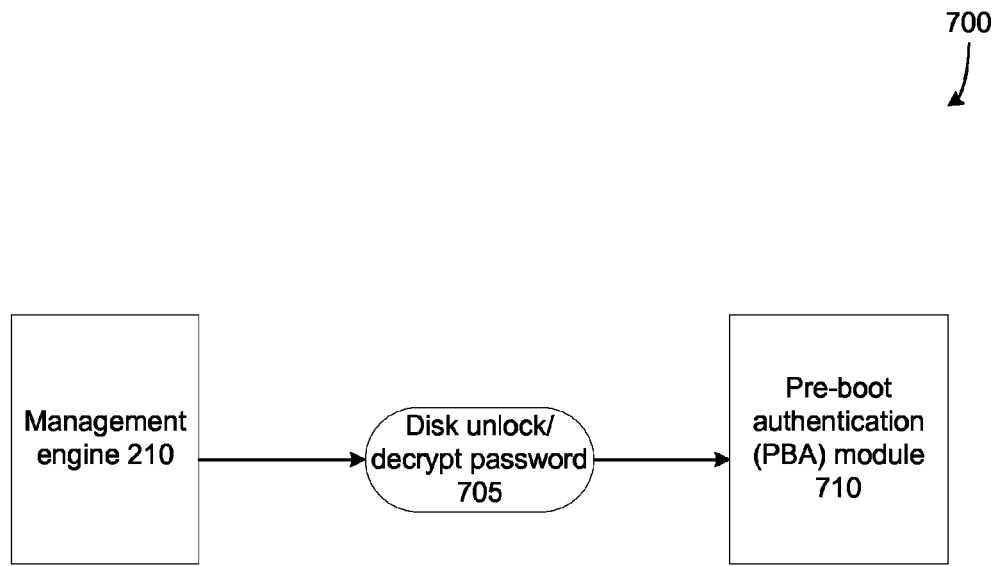
FIG. 7 illustrates the transfer of a disk unlock/decrypt password from a management engine to a pre-boot authentication module, according to an embodiment.

In the case of the disk unlock/decrypt password, the authentication of this password may be the responsibility of the PC client full disk encryption authentication module. As discussed above, this module may be incorporated into management engine firmware. The processing of this password is illustrated in FIG. 7, according to an embodiment. Here, the disk unlock/decrypt password 705 may be sent from the PC client full disk encryption authentication module in management engine 210, after authentication is completed, to a pre-boot authentication module 750. The pre-boot authentication module may be located at the PC, external to the ME 210. The pre-boot authentication module 750 may then allow the operating system to continue to the boot stage, assuming successful authentication and decryption of the hard disk.

Figure 8:
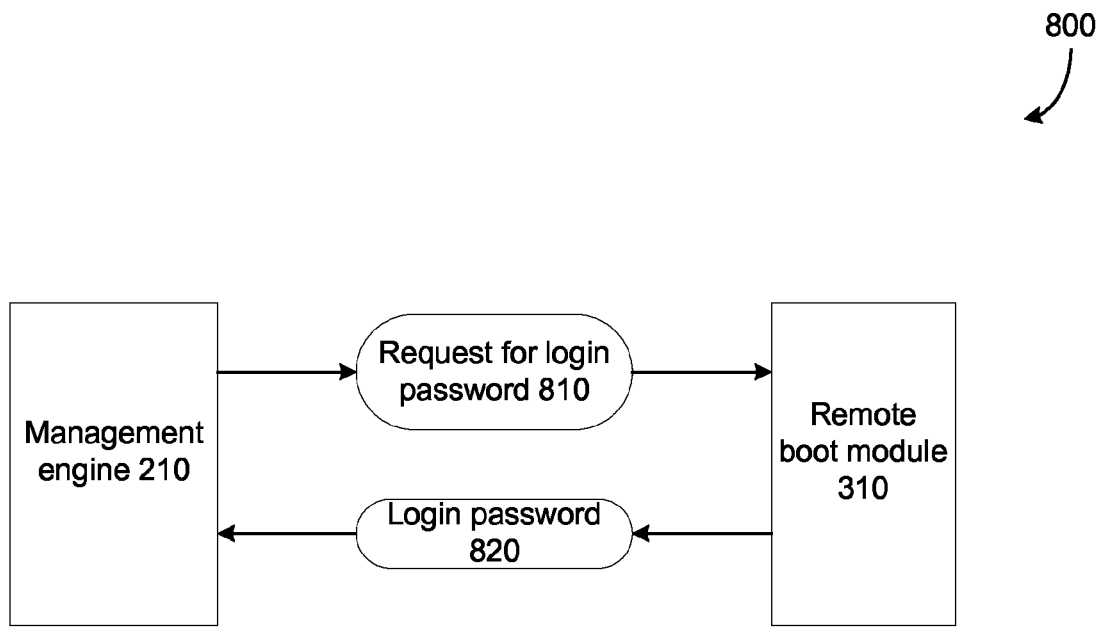
FIG. 8 illustrates the request, by a management engine, of a login password from a remote mobile device, according to an embodiment.

Once any BIOS passwords are received and authenticated, the boot process can proceed. At this point, the management engine may request a login password from the remote mobile device. This is illustrated in FIG. 8. The management engine 210 may issue a request 810, seeking a login password from the remote boot module 310 at the remote mobile device. A login password 820 may then be provided by the remote boot module 310. In an embodiment, this exchange may take place over SMS.

Figure 9:
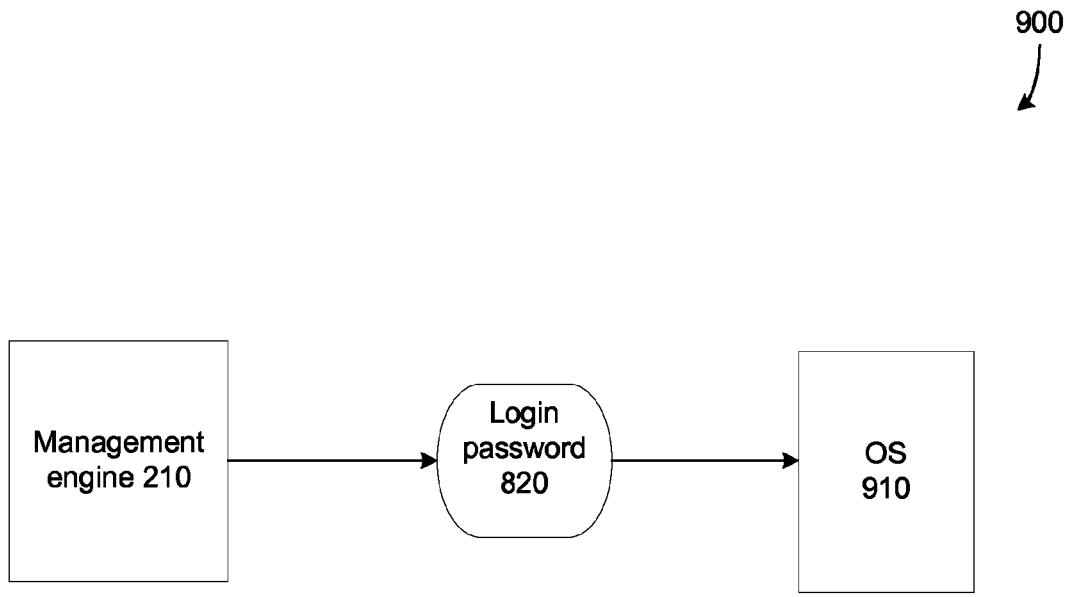
FIG. 9 illustrates the transfer of a login password from a management engine to an operating system, according to one embodiment.

Moreover, the login password 820 may be encrypted and/or authenticated for security reasons. Authentication may be the responsibility of the PC client windows login module in management engine 210. As shown in FIG. 9, the management engine 210 may then pass the login password 820 to the OS 910 of the PC.

Figure 10:
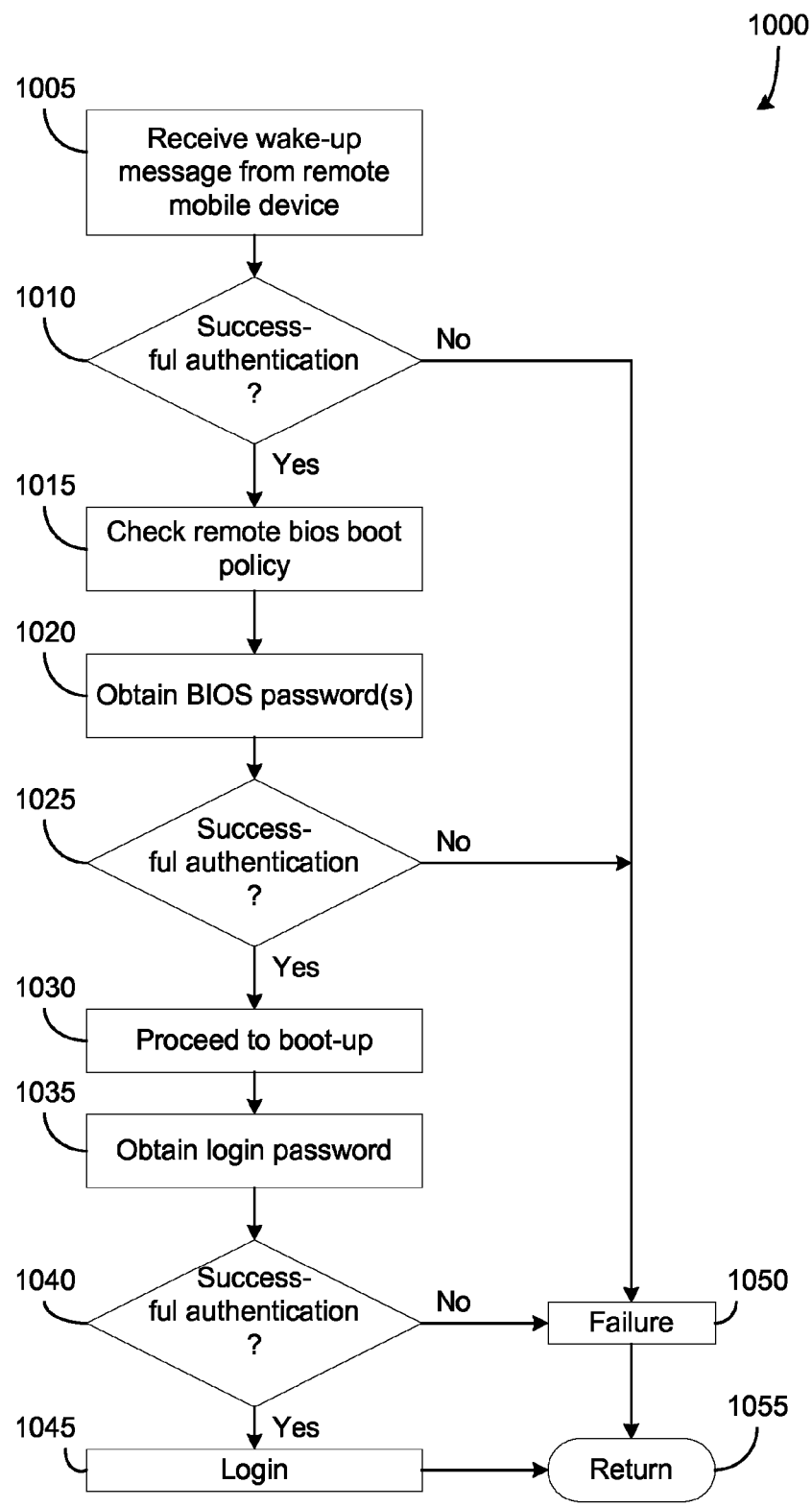
FIG. 10 is a flowchart illustrating the processing described herein, according to an embodiment.

The processing of the system described herein is illustrated in FIG. 10, according to an embodiment. At 1005, a wake-up message may be received at the PC from the remote mobile device. In an embodiment, the wake-up message may be sent using SMS. As discussed above, this message may have been encrypted and/or authenticated. Encryption and authentication may be implemented according to any scheme known to those of ordinary skill in the art. For example, encryption may use a symmetric key or an asymmetric key. In an embodiment, authentication may comprise a public-key protocol. At 1010, authentication of the wake-up message may be attempted. If this authentication is not successful, then a failure state 1050 may be reached, and the process may concludes at 1055 without the operating system booting up and without login.

If, at 1010, authentication of the wake-up message is successful, then the process may continue to 1015. Here, the remote BIOS boot policy is checked in light of the source of the wake-up message received at 1005.

At 1020, the management engine requests one or more BIOS passwords from the remote boot module at the remote mobile device. The remote boot module may respond by providing the requested password(s) to the management engine. As discussed above, the requested passwords may include a BIOS boot password, a pre-boot BIOS password, a disk unlock/decrypt password, and an antitheft recovery password. In an embodiment, both the request and the passwords may be transmitted using SMS. Moreover, the passwords may be encrypted and/or authenticated. As in the case of the wake-up message, encryption may use a symmetric key or an asymmetric key. In an embodiment, authentication may use a public-key protocol. At 1025, authentication may be attempted. If authentication of any of the passwords fails, then a failure state may be attained at 1050, and the process may conclude at 1055. At this point, the operating system will not have booted. If the received BIOS passwords are successfully authenticated at 1025, then processing may continue at 1030, where the operating system may be permitted to boot.

At 1035, the management engine may request a login password from the remote boot module of the remote mobile device. The remote boot module may then respond by providing a login password. Both the request and the password may be sent using SMS, according to one embodiment. As in the earlier transactions, the password may be encrypted and/or authenticated. Encryption may use a symmetric key or an asymmetric key, while in an embodiment the authentication process may include a public key protocol. At 1040, a determination is made as to whether authentication of the login password is successful. If not, then a failure state is reached at 1050, and the process concludes at 1055 without login taking place. If the authentication of the login password is successful at 1040, then login may proceed at 1045. The process may then conclude at 1055.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 11:
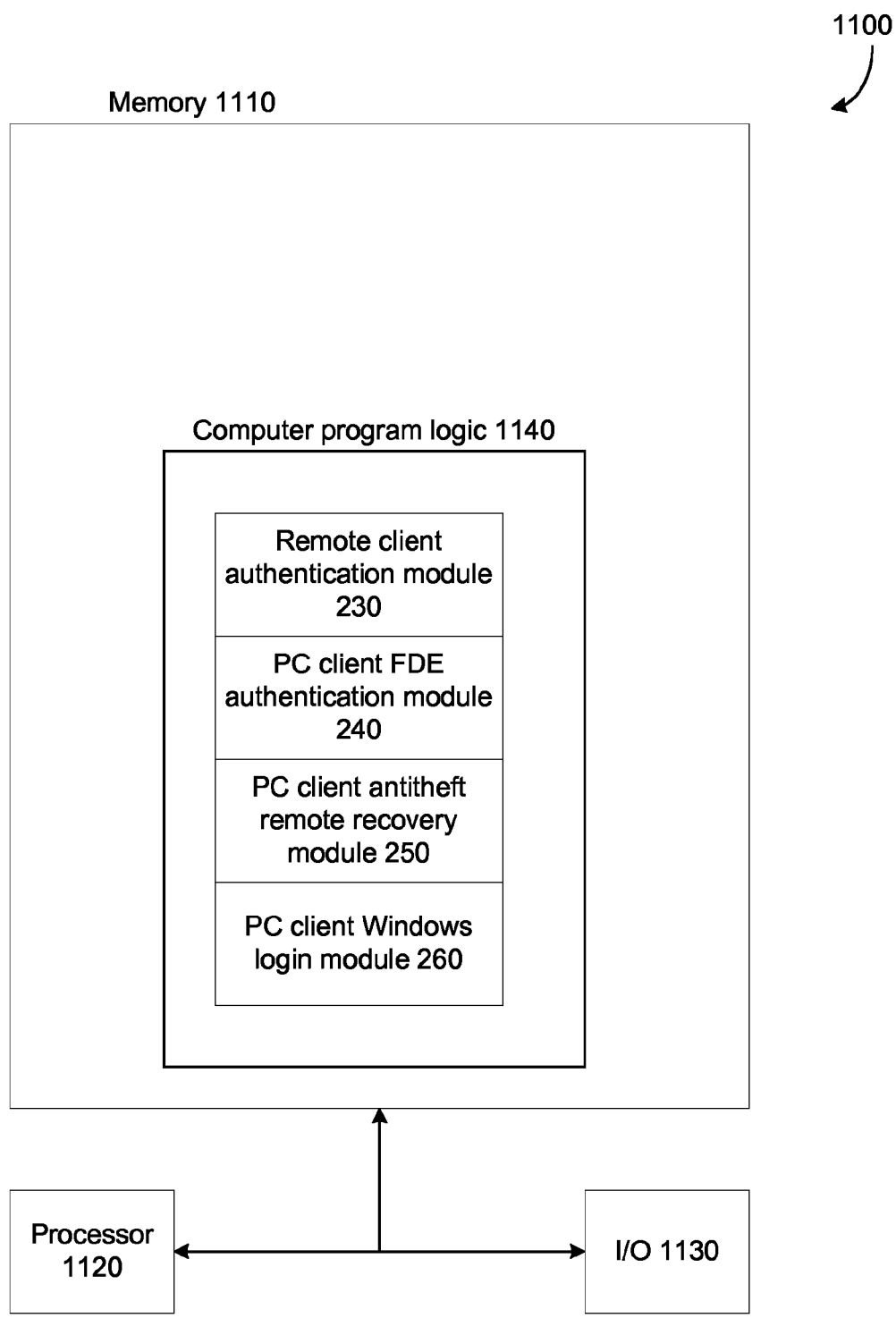
FIG. 11 is a block diagram illustrating a software or firmware embodiment of the system described herein.

A software or firmware embodiment of the processing described above is illustrated in FIG. 11. System 1100 may include a processor 1120 and a body of memory 1110. Memory may include one or more computer readable media that may store computer program logic 1140. Memory 1110 may be implemented as a hard disk and drive, a removable media such as a compact disk and drive, or read-only memory (ROM) or flash device(s), for example, or some combination thereof. Processor 1120 and memory 1110 may be in communication using any of several technologies known to one of ordinary skill in the art, such as a bus. Logic contained in memory 1110 may be read and executed by processor 1120. One or more I/O ports and/or I/O devices, shown collectively as I/O 1130, may also be connected to processor 1120 and memory 1110. In an embodiment, system 1100 is incorporated in the context of a PC platform. Here, the processor 1120 may be an out-of-band processor that is distinct from a primary microprocessor used for the PC.

In the illustrated embodiment, the computer program logic 1140 may include several modules, such as remote client authentication module 230. As discussed above, this module may be responsible for authenticating a remote user or client.

Computer program logic 1140 may also include a PC client full disk encryption (FDE) authentication module 240. Module 240 may be responsible for receiving a disk unlock/decrypt password from the remote mobile device. The FDE authentication module 240 may provide authentication services in such a transaction. The FDE authentication module 240 may provide this password to ME firmware if authentication succeeds.

Computer program logic 1140 may also include PC client antitheft remote recovery module 250. This module may be responsible for receiving a user's antitheft recovery password from the remote mobile device, and providing authentication services for the recovery password. If the authentication is passed, the boot process may be allowed to continue.

Computer program logic 1140 may also include a PC client Windows login module 260. Module 260 may be responsible for authenticating an attempt to remotely login to the OS. Login module 260 may provide the OS login password to the OS securely via the ME.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
receiving, at a computer, a wake-up message from a remote mobile device via a short message service (SMS);
authenticating, at the computer, the wake-up message so as to authenticate a source of the wake-up message;
providing, at the computer, a BIOS boot policy that specifies different security protocols, including different types of authentication and encryption, for handling access attempts from different sources;
querying the BIOS boot policy for an appropriate security policy among the different security protocols for handling the remote mobile device, based on the authenticated source of the wake-up message;
receiving, from the BIOS boot policy the appropriate security policy, including the types of authentication and decryption, to be applied to the source of the wake-up message;
requesting, via the SMS, a BIOS boot password from the remote mobile device;
decrypting and authenticating the BIOS boot password that is received, via the SMS, from the remote mobile device, wherein the BIOS executes when the authentication of the received BIOS boot password succeeds;
requesting, via the SMS, a login password from the remote mobile device; and
decrypting the login password that is received, via the SMS, from the remote mobile device.

2. The method of claim 1, further comprising:
booting an operating system (OS); and
logging a user into the OS, wherein the user is associated with the remote mobile device.

3. The method of claim 1, further comprising:
requesting, via the SMS, a subsequent BIOS password from the remote mobile device, performed when the authentication of the BIOS password fails.

4. The method of claim 1, wherein said authentication of the BIOS password is performed using a public-key protocol.

5. The method of claim 2, further comprising:
authenticating the received log in password, wherein login proceeds when the authentication of the login password succeeds.

6. The method of claim 5, further comprising:
requesting, via the SMS, a subsequent login password from the remote mobile device, performed when the authentication of the login password fails.

7. The method of claim 5, wherein said authentication of the login password is performed using a public-key protocol.

8. The method of claim 1, wherein the BIOS password comprises one of:
a BIOS boot password;
a pre-boot BIOS password;
a disk unlock/decrypt password; and
a user antitheft recovery password.

9. The method of claim 1, wherein:
the requesting, via the SMS, includes requesting the BIOS boot password and a pre-boot BIOS password from the remote mobile device; and
the decrypting and authenticating includes decrypting and authenticating the BIOS boot password and the pre-boot BIOS password that are received, via the SMS, from the remote mobile device, wherein the BIOS executes when the authentication of the received BIOS boot password and the BIOS pre-boot password succeed.

10. A system, comprising:
a. a management engine (ME) incorporated in a computer, said ME comprising:
a memory that stores a remote BIOS boot policy that specifies different security protocols, including different types of authentication and encryption, for handling access attempts from different sources; and
a remote client authentication module configured to receive a wake-up message from a remote mobile device via a short message service (SMS) and to authenticate the wake-up message, so as to authenticate a source thereof;
wherein the ME is configured to request one or more encrypted BIOS boot passwords from the remote mobile device based on the source of the authenticated wake-up message, to receive said one or more boot passwords, to decrypt and authenticate said one or more boot passwords, and to permit booting of an operating system (OS) when authentication of the one or more boot passwords succeeds, and
wherein the ME is further configured to request an encrypted login password from the remote mobile device, to receive and decrypt said login password, and to allow access to the OS by a user associated with the remote mobile device; and
b. a basic input/output system (BIOS) configured to determine the source of the authenticated wake-up message and to query the remote BIOS boot policy for an appropriate security policy among the different security protocols for handling the remote mobile device, based on the authenticated source of the wake-up message, and
receive from the BIOS boot policy the appropriate security policy, including the types of authentication and decryption, to be applied to the source of the wake-up message.

11. The system of claim 10, wherein said one or more BIOS passwords comprise a disk unlock/decrypt password.

12. The system of claim 11, wherein said ME further comprises:
a full disk encryption (FDE) authentication module, configured to authenticate said disc unlock/decrypt password.

13. The system of claim 10, wherein said one or more BIOS passwords comprise an antitheft recovery password.

14. The system of claim 13, wherein said ME further comprises:
an antitheft remote recovery module, configured to authenticate said antitheft recovery password.

15. The system of claim 10, wherein said ME further comprises:
a login module, configured to authenticate said login password.

16. The method of claim 10, wherein:
the request, via the SMS, includes a request for the BIOS boot password and a pre-boot BIOS password from the remote mobile device; and
the ME decrypts and authenticates the BIOS boot password and the pre-boot BIOS password that are received, via the SMS, from the remote mobile device, and to permit the BIOS to execute when the authentication of the received BIOS boot password and the BIOS pre-boot password succeed.

17. A non-transitory computer readable medium encoded with a computer program, including instructions to cause a processor to:
- receive, at a computer, a wake-up message from a remote mobile device via a short message service (SMS), the computer having stored therein a BIOS boot policy that specifies different security protocols, including different types of authentication and encryption, for handling access attempts from different sources;
- authenticate, at the computer, the wake-up message so as to authenticate a source of the wake-up message;
- query the BIOS boot policy for an appropriate security policy among the different security protocols for handling the remote mobile device, based on the authenticated source of the wake-up message;
- receive, from the BIOS boot policy the appropriate security policy, including the types of authentication and decryption, to be applied to the source of the wake-up message;
- request, via the SMS, a BIOS boot password from the remote mobile device;
- decrypt and authenticate the BIOS boot password that is received, via the SMS, from the remote mobile device, wherein the BIOS executes only when the authentication of the received BIOS boot password succeeds;
- request, via the SMS, a login password from the remote mobile device; and
- decrypt the login password that is received, via the SMS, from the remote mobile device.

18. The computer readable medium of claim 17, further including instructions to cause the processor to:
- request, via the SMS, a subsequent BIOS password from the remote mobile device, performed when the authentication of the BIOS password fails.

19. The computer readable medium of claim 17, wherein said authentication of the BIOS password is performed using a public-key protocol.

20. The computer readable medium of claim 17, further including instructions to cause the processor to:
- authenticate the received login password, wherein the login proceeds only when the authentication of the login password succeeds.

21. The computer readable medium of claim 20, wherein said authentication of the received login password is performed using a public-key protocol.

22. The computer readable medium of claim 17, further including instructions to cause the processor to:
- request, via the SMS, a subsequent login password from the remote mobile device, performed when the authentication of the login password fails.

23. The computer readable medium of claim 17, wherein the BIOS password comprises one of:
- a BIOS boot password;
- a pre-boot BIOS password;
- a disk unlock/decrypt password; and
- a user antitheft recovery password.

24. The method of claim 17, wherein:
- the request, via the SMS, includes a request for the BIOS boot password and a pre-boot BIOS password from the remote mobile device; and
- the instructions further include instructions to cause the processor to decrypt and authenticate the BIOS boot password and the pre-boot BIOS password that are received, via the SMS, from the remote mobile device.

* * * * *